March 16, 1948.  E. A. CONNER  2,437,725
WINDING MACHINE
Filed Nov. 23, 1945  2 Sheets-Sheet 1

INVENTOR
EDWARD A. CONNER
BY
ATTORNEY

March 16, 1948. E. A. CONNER 2,437,725
WINDING MACHINE
Filed Nov. 23, 1945 2 Sheets-Sheet 2
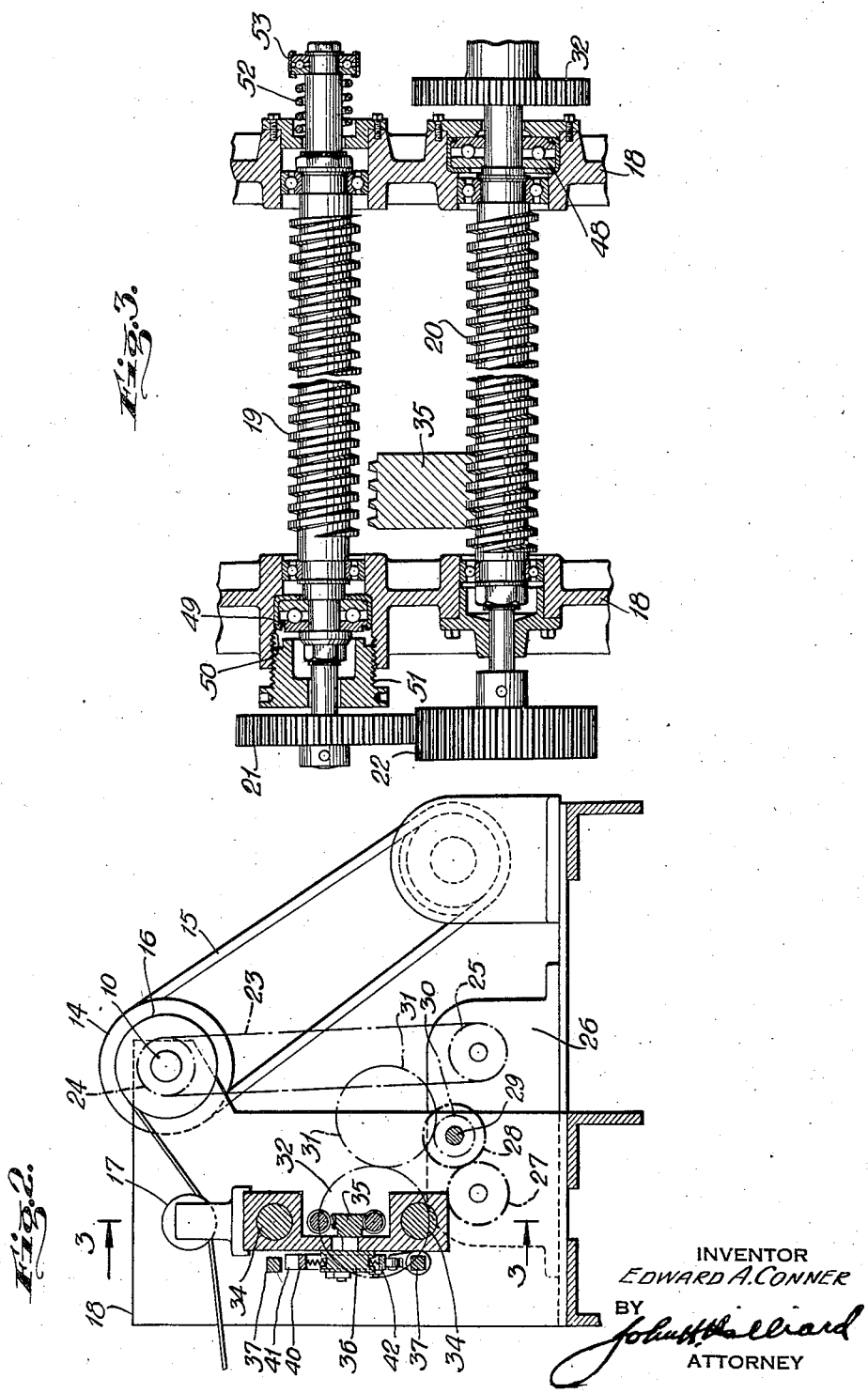
INVENTOR
EDWARD A. CONNER
BY
ATTORNEY Patented Mar. 16, 1948

2,437,725

UNITED STATES PATENT OFFICE 2,437,725

WINDING MACHINE

Edward A. Conner, Stratford, Conn., assignor to American Chain & Cable Company, Inc., Bridgeport, Conn., a corporation of New York Application November 23, 1945, Serial No. 630,245

6 Claims. (Cl. 242—9)

This invention relates to winding, and more particularly to the accurate formation of coils for various purposes.

Coils intended for rapid unwinding by axial paying out of the line, and other devices employing coils in which a very even and very close spacing is desired, have a distributing mechanism which, in general, consists of a guide for the line, and means for producing relative movement between the mandrel upon which the line is being wound and this guide. Reversing mechanisms are generally known which automatically reverse the direction of travel of the line axially of the mandrel, but they suffer from the disadvantage of producing a slight discontinuity at the end of each layer being wound. It is with this defect of present winding machines that the present invention is concerned.

Another defect of ordinary winding mechanisms is that the line cannot be wound with these machines in such a manner as to produce a coil that is as closely wound as would be possible with hand winding at very low speeds. This is because the guide should be so positioned with reference to the line being wound that it lags slightly regardless of the direction in which it is traveling along the mandrel axis.

It is therefore a primary object of the present invention to provide a distributing mechanism for winding machines which makes provision for the discontinuity ordinarily encountered at each end of a layer of closely wound line.

It is a further object of the present invention to provide a winding machine which will wind the line closely without the intervention of manual adjustment.

Further objects and advantages will become apparent as this description proceeds, the description and drawings referring to one form of the present invention and being illustrative rather than limitative, the invention being best comprehended from the claims rather than from this description.

Referring now to the drawings:

Fig. 2 shows a section taken on line 2—2 of Fig. 1; and

Fig. 3 shows a fragmentary section taken on line 3—3 of Fig. 2.

Figure 1:
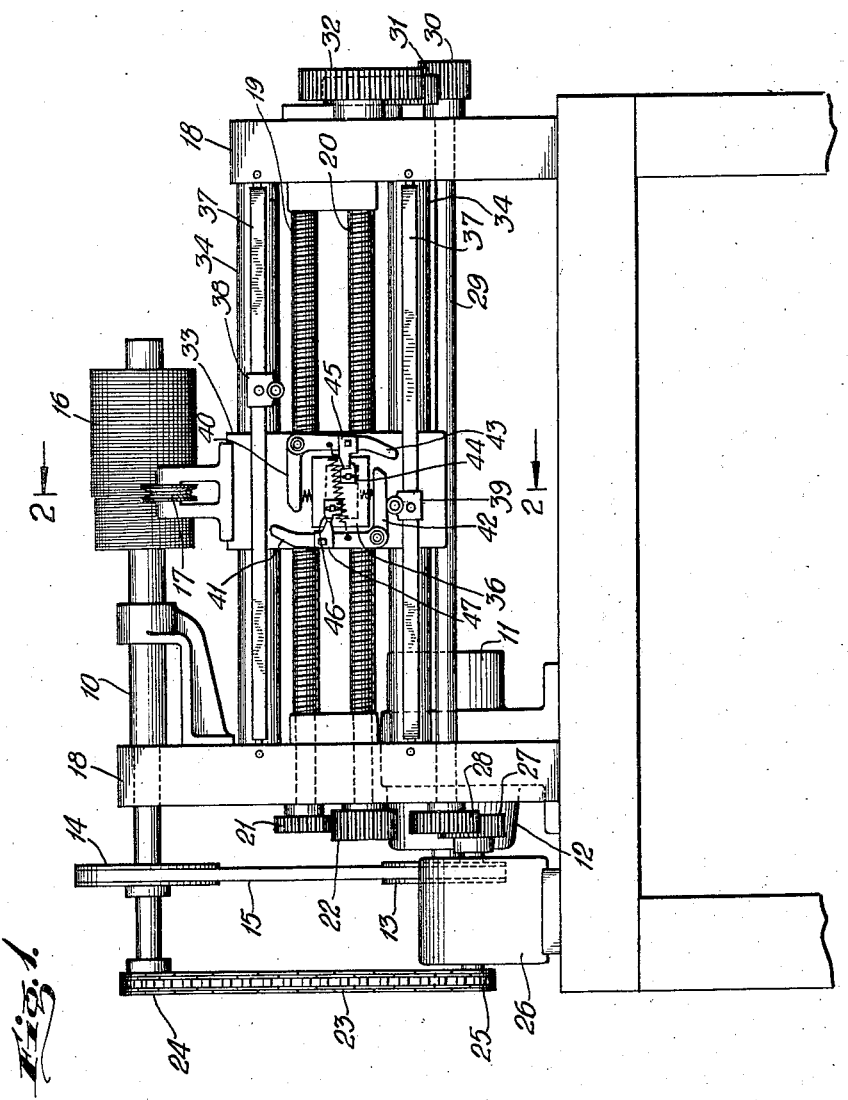
Fig. 1 shows a front elevation of one form of machine embodying the present invention.

The winding machine illustrated in the drawing comprises a shaft 10 mounted for rotation and driven by a motor 11 through a change speed device 12. The drive is from an output pulley 13 of the change speed device to a pulley 14 mounted on the shaft 10, a belt 15 connecting these pulleys. Rotation of this shaft 10 causes formation of coil 16 on a mandrel or spool on the shaft.

In order to guide the line onto the coil 16 properly, a sheave 17 is employed. Means is provided for causing reciprocation of this sheave 17 back and forth along the axis of the shaft 10. It is with this mechanism that the present invention has chiefly to do.

A pair of supports 18 carry bearings which support lead screws 19 and 20 for rotation. These lead screws have threads of the same hand but are geared together by means of gears 21 and 22 to rotate in opposite directions. Thus, one screw can be used for causing travel in one direction and the other for travel in the opposite direction.

In order to drive the screws at the proper rotative speed, a chain 23 is provided which is driven from the sprocket 24 on the shaft 10 and, in turn, drives the sprocket 25 on a change speed device 26. The output shaft of the change speed device carries a gear 27 which meshes with another gear 28 which, in turn, drives a shaft 29. This shaft 29, through the intermediacy of gears 30, 31, and 32, transmits the rotary motion of the shaft to the lower lead screw 20. Rotation of the shaft 10 therefore produces a rotation of both of the screws 19 and 20 in opposite directions, the angular velocity of the lead screws having a definite relation to the angular velocity of the shaft 10 depending upon the setting of the change speed device 26. The change speed device 26 is for the purpose of permitting a different rate of feed whereby coils of different size line may be formed.

In order to transform the rotary motion of the screws 19 and 20 to a reciprocating motion, a carriage 33 is mounted on a pair of fixed shafts 34 for sliding movement thereon. A member 35 having threads thereon, being in effect two halves of a split nut with their threads on the outside, is secured to a plate 36 which has a portion passing through the slot in the carriage 33 for movement in a vertical direction. The walls of the slot, however, prevent movement relative to the carriage in a horizontal direction, and thus engagement of the nut 35 with one of the lead screws causing feeding movement of the carriage 33.

In order to reverse the motion of the carriage 33 at each end of each successive layer of line, rails 37 mounted on the supports 18 are provided with stop members 38 and 39. The stop members are preferably provided with rollers for engagement with parts of the reversing mechanism. These stop members are adjustable along the rails, but, when the machine is in operation, they are fixed in place by the set screws shown.

Mounted on the carriage 33 are four levers 40, 41, 42, and 43. Levers 40 and 41 are for engagement with the stop 38, while levers 42 and 43 are for engagement with the stop 39. All of these levers are mounted for independent swinging movement, and the fact that they are arranged in pairs on two pivots is merely for convenience and simplicity. Levers 40 and 42 swing about a vertical arc, and such swinging movement compresses springs between them and the member 36. In the stage of operation illustrated, the lever 42 is being moved upwardly by the roller on stop 39, which compresses the spring between it and the member 36, thus urging the member 36 to move in an upward direction. This movement is, however, prevented by a pair of dogs forming a latch. These dogs are illustrated as a dog 44 mounted on the member 36 and a dog 45 mounted on the lever 43. It can be seen that, as the carriage continues to travel to the left (in Fig. 1, the roller on the stop 39 must strike the end of lever 43 and cause disengagement of the latch formed by dogs 44 and 45. When this occurs, the spring between the lever 42 and the member 36 will cause upward motion of the member 36. When the nut 35 is properly seated in the threads of the upper lead screw 19, the latch members 46 and 47 which are secured to the member 36 and the lever 41, respectively, engage, holding the nut in place in engagement with the lead screw 19 while the carriage moves to the right. Upon reaching the stop 38, the same cycle of operation takes place and reverses the motion to cause the carriage again to travel to the left.

In order to permit a slight dwell at each end of the travel, which is for the purpose of making a perfect cross-over from one layer to the next succeeding layer and also to cause the sheave 17 to lag slightly whereby the line is caused to wind closely on the coil being formed, the construction particularly illustrated in Fig. 3 is employed. As shown in this view, the lead screws 19 and 20 are provided with radial bearings and with thrust bearings. The lower screw is prevented from moving axially as it drives the nut 35 by means of the thrust bearing 48. The lead screw 19, on the other hand, is given a certain amount of end play. This end play is obtained by mounting the thrust bearing 49 for axial movement in the bore 50. The thrust bearing is mounted so that it does not move axially on the shaft forming the end of the screw 19. The amount of movement of the bearing 49 within the bore 50 may be regulated by turning a bushing 51 which threadedly engages the support 18. On the other end of the screw 19 there is shown a spring 52 and a thrust bearing 53, which are for the purpose of urging screw 19 to the right, while at the same time permitting free rotation.

The operation of the present device is as follows:

Assuming that the parts are in the position shown in Fig. 3 with the carriage and the nut member 35 traveling to the left, upon disengagement of the latches 44 and 45 the nut 35 is moved upward. The screw 19 then turns to drive the nut 35 to the right. However, it is ineffective to so drive the nut because of the end play between the thrust bearing 49 and the bushing 51. The screw thus turns and travels to the left while the nut remains stationary until this end play is taken up. When the end play is taken up, the nut is driven to the right. On reaching the right end of its travel, the nut is released from the screw 19 and urged downwardly. However, the nut 35 is not immediately engaged in the threads of the screw 20 because of the displacement of the screw 19 from the position shown in Fig. 3. The nut will not therefore be driven but will ride on top of the threads of the screw 20. The carriage will then remain stationary until the screw 20 turns a sufficient amount to permit engagement of the threads on the nut 35 and the threads on the screw 20. When this happens, the nut will be driven to the left. The delay at the right end of the travel is exactly the same as the delay at the left end which is what is desired.

The spring 52 and the thrust bearing 53 have been assigned a definite function. However, it is possible to dispense with them. The action in that case will be a little bit different. Assuming that the spring 52 is absent, the screw 19 will be pushed to the left of its present position by previous engagement of the nut with it. When the nut 35 rises under the influence of the spring between the lever 42 and the member 36, it will engage the threads of the screw 19 and force the screw 19 to the right. This, of course, requires that the end play desired be small enough so that the inclined sides of the threads on the nut engage the proper inclined sides of the threads on the screw. The spring urging the nut 35 upwardly will then be able to move it upwardly by sliding the screw 19 to the right, thus performing the function of spring 52. Then the screw 19 continues to turn while the nut is stationary until the screw takes its leftmost position and the drive begins. The change from screw 19 to screw 20 is the same as was before described. The device with the spring 52 present, however, does not require engagement of the inclined surfaces but, on the contrary, will work if the flat tops of the threads engage, and it is thus possible to obtain considerably more lag with the form of thread shown. This is the only difference between the two forms of the device described.

Of course, it will be understood that the end play, and therefore the lag that can be obtained, must be small enough in both forms of device so that the nut engages the same thread each time. However, by using a coarse pitch screw, and rotating it slowly, the lag can be much greater than that shown.

The above description of the method and machine embodying my invention is intended to be illustrative only, and not limitative, the scope of the present invention being best comprehended from the appended claims.

I claim:

1. In a coil winding machine for forming coils of even successive layers of line of the type including means producing winding motion and relative traversing motion between a line guide and the coil being formed, the combination of a carriage mounted for movement to cause relative traverse, a pair of screw members rotatable in response to winding motion, a nut alternatively engageable with either screw member and operative upon such engagement to cause motion of the carriage, the screw members driving the nut in opposite directions, and means producing lost motion between the winding motion and the motion of the carriage upon disengagement of the nut from one screw member and engagement with the other, whereby a dwell is produced in the motion of the carriage at the end of traverse.

2. In a coil winding machine for forming coils of even successive layers of line of the type including means producing winding motion and relative traversing motion betwen a line guide and the coil being formed, the combination of a carriage mounted for movement to cause such relative traverse, a pair of screw members rotatable in response to the winding motion, a nut alternatively engageable with either screw and operative during such engagement to cause traverse of the carriage, the screw members driving the nut in opposite directions, one of the screw members being capable of limited axial motion, whereby upon initial engagement of the nut with that screw member rotation of the screw member causes axial motion thereof, permitting a dwell in the movement of the carriage until the limit of such axial motion is reached.

3. In a coil winding machine for forming coils of even successive layers of line of the type including means producing winding motion and relative traversing motion between a line guide and the coil being formed, the combination of a carriage mounted for movement to cause such relative traverse, a pair of screw members rotatable in response to the winding motion, a nut alternatively engageable with either screw and operative during such engagement to cause traverse of the carriage, the screw members driving the nut in opposite directions, one of the screw members being capable of axial motion less than the pitch of the screw thread, whereby to permit rotation of the screw member to rotate without driving the carriage upon initial engagement, both of said screw members being related in angular position to cause a dwell in motion of the carriage upon disengagement of the nut from the last mentioned screw member until the nut and the other screw member are in driving relation.

4. In a coil winding machine for forming coils of even successive layers of line of the type including means producing winding motion and relative traversing motion between a line guide and the coil being formed, the combination of a carriage mounted for movement to cause such relative traverse, a pair of screw members rotatable in response to the winding motion, a nut alternatively engageable with either screw and operative during such engagement to cause traverse of the carriage, the screw members driving the nut in opposite directions, one of the screw members being capable of limited axial motion, and spring means urging said screw member in the direction opposite the direction of the thrust exerted thereon by the nut when driven thereby, whereby rotation of said screw member to drive said nut causes axial movement of said screw member until the end play is taken up, after which the screw member drives the nut and carriage.

5. In a coil winding machine for forming coils of even successive layers of line of the type including means producing winding motion and relative traversing motion between a line guide and the coil being formed, the combination of a carriage mounted for movement to produce such relative traverse, a pair of screw members rotatable in response to the winding motion, a nut alternatively engageable with either screw and operative during such engagement to cause traverse of the carriage, the screw members driving the nut in opposite directions, one of said screw members having axial play, spring means urging said screw member in the direction opposite the direction of the thrust exerted thereon by the nut when driven thereby but yielding under the driving thrust, whereby rotation of said screw member to drive said nut causes axial movement of said screw member until the axial play is taken up, after which the screw member drives the nut and the carriage.

6. In a coil winding machine for forming coils of even successive layers of line of the type including means producing winding motion and relative traversing motion between a line guide and the coil being formed, the combination of a carriage mounted for movement to produce such relative traverse, a pair of screw members rotatable in response to the winding motion, a nut alternatively engageable with either screw and operative during such engagement to cause traverse of the carriage, the screw members driving the nut in opposite directions, one of said screw members being mounted for axial movement less than the pitch of the threads of the screw, and spring means urging the nut into engagement with the screw members, the angular relation between the screw members being such that movement of the nut into initial engagement with the axially movable screw member causes axial movement of said screw member in a direction opposite the driving thrust.

EDWARD A. CONNER.

REFERENCES CITED

The following references are of record in the file of this patent:

UNITED STATES PATENTS

| Number | Name | Date |
| --- | --- | --- |
| 1,504,004 | Vienneau | Aug. 5, 1924 |